(12) United States Patent
Sastry

(10) Patent No.: US 6,755,036 B1
(45) Date of Patent: Jun. 29, 2004

(54) CONFINED SPACE CONDITIONING SYSTEM

(75) Inventor: Kal Sastry, El Cerrito, CA (US)

(73) Assignee: Spex International, El Cerrito, CA (US)

( * ) Notice: Subject to any disclaimer, the term of this patent is extended or adjusted under 35 U.S.C. 154(b) by 0 days.

(21) Appl. No.: 10/314,009

(22) Filed: Dec. 6, 2002

(51) Int. Cl.[7] .............................................. F25B 49/00
(52) U.S. Cl. ........................................ 62/176.5; 454/188
(58) Field of Search .............................. 62/176.5, 440, 62/441, 467, 498; 454/188

(56) References Cited

U.S. PATENT DOCUMENTS 3,666,004 A * 5/1972 Hilgemann et al. ............ 165/19
5,752,389 A * 5/1998 Harper ....................... 62/176.5
5,890,957 A * 4/1999 Scherer et al. ................ 454/76

* cited by examiner

*Primary Examiner*—Denise L. Esquivel
*Assistant Examiner*—Malik N. Drake
(74) *Attorney, Agent, or Firm*—William L. Botjer

(57) ABSTRACT

The present invention is a confined space conditioning system, which is used to provide conditioning to localized zones of an enclosure. The confined space conditioning system consists of a conditioning unit and an enveloped space, enveloping the localized zone, connected to the conditioning unit. The conditioning unit uses a low wattage compressor and a heater element to generate cool, dehumidified air or warm conditioned air to the enveloped space, as is required by a user of the system. The used conditioned air is extracted from the enveloped space and is recirculated to the conditioning unit for reconditioning. The surfaces of the enveloped space are thermally insulated using thermally insulating media in order to minimize the cross flow of heat.

20 Claims, 4 Drawing Sheets

CONFINED SPACE CONDITIONING SYSTEM

BACKGROUND

The present invention relates to air conditioning, heating and ventilation. More specifically, the present invention relates to a system for conditioning a given localized space.

Air conditioning systems maintain suitable temperature and humidity conditions in enclosed spaces. This is achieved by supplying conditioned air to these enclosed spaces. Conditioned air may include cooled air, dehumidified air or warmed air, as the case may be, and the enclosure could be a large room connected to a window air conditioner or a central air conditioner (wherein the air conditioner "conditions" the entire room).

Apart from providing personal air conditioning, such systems are also used in diverse fields like commercial, research, medical and industrial applications. These air conditioning systems, by virtue of their design, cannot be used to provide only localized conditioning to specific zones of the enclosure and hence are not suitable for use in situations where only localized conditioning is required.

A common disadvantage of the existing air conditioning systems is that they involve high initial equipment cost and continuous use of large amounts of energy. (Since the systems are essentially designed to condition complete enclosures, they need to be high capacity systems, which in turn increases the equipment cost associated with these systems.) However, there exist several situations in everyday life where only specific zones of an enclosure need to be conditioned. For example, in a large dining hall, conditioning may not be required for the complete hall; in fact, it may be required only around the dining table. Nevertheless, even in these situations, current air-conditioning systems would end up conditioning the complete hall, and hence require high equipment and energy costs.

Another example is a commercial office space where it may be desirable to condition space around a copying machine (in order to prevent the sticking of papers due to high humidity). In such a situation, there is no need to condition the entire copying room. Yet another example is an industrial application where a control and switch panel has to be kept in a controlled atmosphere (and not the entire control room). In all these situations, a user can save a significant amount of resources if he provides localized conditioning only around the copying machine or the control and switch panel.

Due to the above-mentioned limitations of the existing air conditioning systems, these systems cannot address the requirements of localized conditioning. There have been attempts at designing systems that can be used to provide conditioning to a localized region.

U.S. Pat. No. 6,446,455 describes one such conditioning system; this makes use of the concept of spot cooling. Although such systems improve the localized conditioning effect in a specific region, they still consumes large amount of energy (than is required to condition just the localized zone). This is because such systems also end up conditioning the air that surrounds the localized zone.

U.S. Pat. No. 6,171,333 describes another system for localized conditioning. The system described in this patent describes a comforting unit. The comforting unit comprises a bladder, which consists of flexible panels coupled together to encompass an air space there between them. The air space is heated or cooled in order to provide heating or cooling comfort to the user. However, this invention does not involve direct heating or cooling. The invention provides heating or cooling comfort to the user indirectly by heating or cooling an air space that is not in direct contact with the user.

U.S. Pat. No. 5,989,285 describes another such system for providing indirect localized conditioning. The invention described in this patent comprises a temperature controlled blanket and bedding wherein a temperature controlled fluid is circulated through the blanket in order to maintain the blanket at a specific temperature. A limitation of this conditioning system is that it provides heating or cooling comfort to a user only in an indirect manner (i.e., by heating or cooling an air space, which is not in contact with the user) and does not directly condition the enclosed space in the same manner as typical air conditioning systems.

U.S. Pat. No. 6,453,678 describes a direct current mini air conditioning system that enables conditioning of small enclosed spaces (such as cabins of trucks and boats). However, the use of the mini air conditioning system described in this patent is restricted to conditioning the entire enclosed space, and it does not encompass conditioning of localized zones within the space. Further, the system described in this patent uses a direct current air conditioner, which cannot be used in normal household or commercial conditions where direct current (i.e., DC current) sources are not available.

Hence, there exists a need for a conditioning system that is relatively less expensive, that can be powered by alternating current (i.e., AC current) sources, and that can provide localized conditioning to specific zones of a confined space in an energy-efficient manner.

SUMMARY

It is a general object of the invention to provide a system for air conditioning, heating and ventilation.

It is an object of the invention to provide a confined space conditioning system that allows for controlled airflow, temperature and humidity conditions within a zone in an enclosure.

Yet another object of the invention is to provide a low energy consumption conditioning system for conditioning specific localized zones within an enclosure at a low initial cost.

In the preferred embodiment, the invention is directed to a confined space conditioning system that conditions localized zones of a given enclosure. The confined space conditioning system comprises of a conditioning unit connected to an enveloped space. The conditioning unit supplies conditioned air to the enveloped space in order to maintain controlled levels of temperature and relative humidity in the enveloped space.

The conditioned air within the enveloped space is circulated back to the conditioning unit. Due to the re-circulation of this "used air," lesser amount of energy is required (as compared to energy required for conditioning the entire enclosed space). The surfaces of the enveloped space are covered by a layer or layers of thermal insulation media. This thermal insulation reduces heat losses from the exposed surface area as well as leakage of conditioned air from the enveloped space.

In another embodiment, the present invention provides a system, which is designed such that only a desired enveloped space is cooled or heated to a level suitable for the individual or individuals or other entities occupying the enveloped space.

An advantage of the present invention is that it provides a conditioning system that has lower connected wattage and energy consumption as compared to the standard central, window or split air conditioners.

Another advantage of the present invention is that the enveloped space is of much smaller volume than the total enclosure, and this allows for quick conditioning of the enveloped space.

Another advantage is that the exposed external surface area of the enveloped space is much smaller than the exposed surface area of the total enclosure, and this results in reduced cross-flow of heat across the exposed surface area of the enveloped space.

Another advantage of the invention is that it provides a compact and lightweight conditioning system as compared to split or window air conditioners.

Another advantage of the invention is that it provides a conditioning system that produces lesser noise than standard window air conditioners and air coolers.

Another advantage of the invention is that it provides a conditioning system that does not require a ceiling fan to attain the comfort levels of temperature.

Yet another advantage of the invention lies in the ease of installation of the conditioning system.

Yet another advantage of the invention is that it provides a conditioning system with features of easy mobility and cartability.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides a confined space conditioning system for conditioning localized zones of an enclosure. The enclosure refers to a volume, within which only specific localized zones need to be conditioned.

Figure 1:
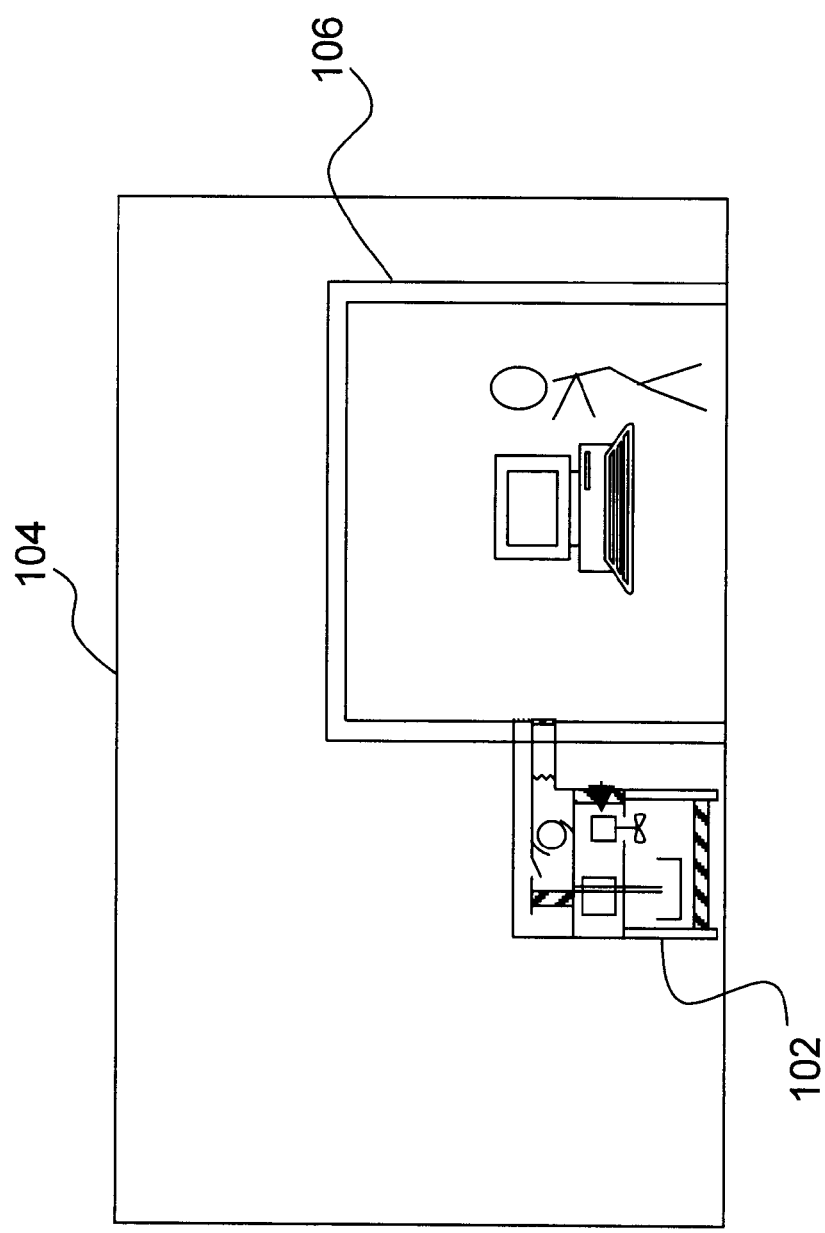
FIG. 1 is a representation of the general environment in which the present invention works.

FIG. 1 is a representation of the general environment in which the present invention works. The present invention comprises a conditioning unit 102 located in an enclosure 104 and connected to an enveloped space 106, which is built inside the enclosure. Conditioning unit 102 generates conditioned air that is supplied to enveloped space 106. Conditioned air may include cooled air, dehumidified air or warmed air (as required). Enveloped space 106 can be designed around any structure like a dining table, bed, copying machine or other equipment, or it may simply be designed around an empty space in enclosure 104. One or more of humans, animals, plants, or commercial equipment, research apparatus, industrial units or other entities may occupy enveloped space 106.

The surfaces of enveloped space 106 are covered by thermal insulation media in order to minimize the cross flow of heat through the surfaces of the enveloped space. The thermal insulation medium can be a layer or layers of insulation material used to cover the surfaces of the enveloped space.

The thermal insulation medium can be in the form of a curtain, wall covering or any other suitable form and can be made of a thermal insulating material like plastic, cotton, synthetic fabrics, their blends or other materials having suitable thermal insulating properties and permeability. The design of the thermal insulation medium is such that it allows adequate permeability for automatic purging of gases like carbon dioxide and water vapor from the enveloped space as well as corresponding intake of fresh air into the enveloped space (for maintaining freshness). The free ends of the thermal insulation media are sealed using an appropriate sealing apparatus. The sealing apparatus is used to secure the free ends of the thermal insulation media with other structures in the enveloped space in order to minimize the leakage of conditioned air from the enveloped space.

Figure 2:
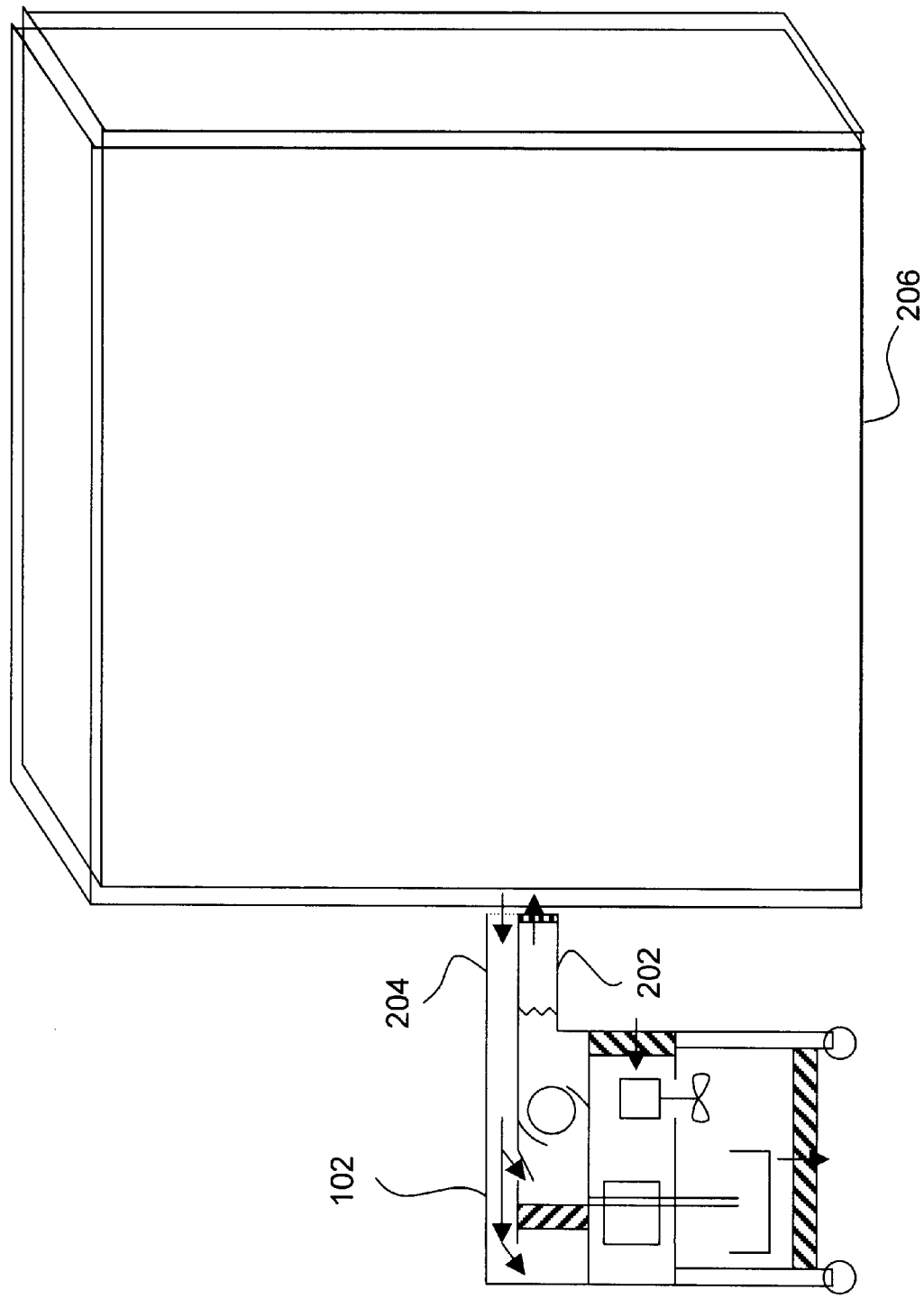
FIG. 2 is a schematic representation showing the connection of conditioning unit 102 to enclosure 106 of FIG. 1 in further detail in accordance with the present invention.

FIG. 2 is a schematic representation showing the connection of conditioning unit 102 to enclosure 106 of FIG. 1 in further detail in accordance with the present invention. Enveloped space 106 is connected to a delivery duct 202 and a connecting duct 204 of conditioning unit 102. Conditioning unit 102 generates conditioned air, which is supplied to enveloped space 106 through delivery duct 202. The conditioned air-conditions the environment inside enveloped space 106 and the used conditioned air is supplied back to conditioning unit 102 through connecting duct 204. Conditioning unit 102 reconditions the used conditioned air and supplies it back to enveloped space 106 through delivery duct 202.

Figure 3:
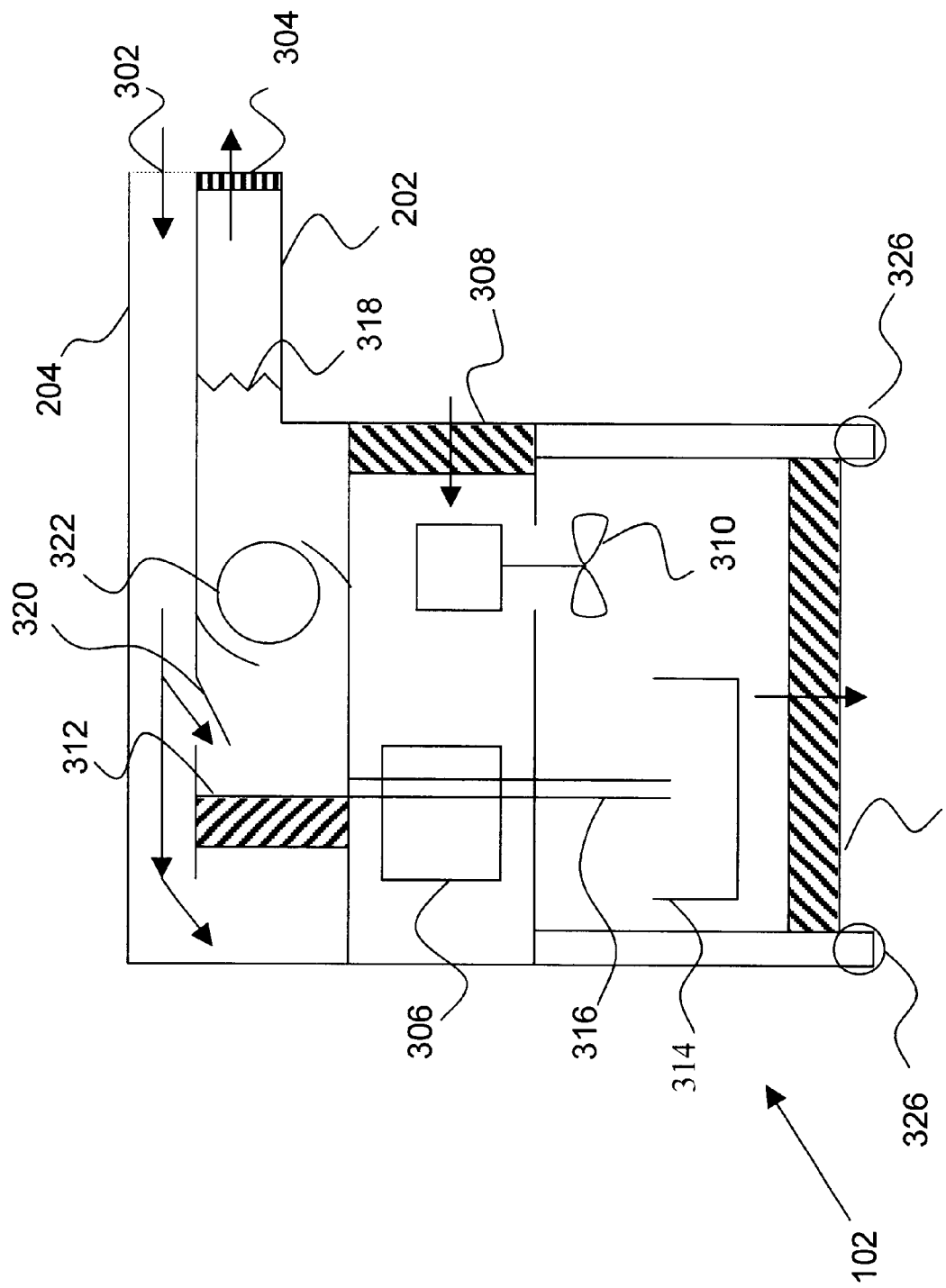
FIG. 3 is a diagram showing conditioning unit 102 and its various components.

FIG. 3 is a diagram showing conditioning unit 102 and its various components. Conditioning unit 102 generates conditioned air using air from the enveloped space. The used conditioned air from the enveloped space is reconditioned by circulating it back to the conditioning unit. For this purpose, conditioning unit 102 has a suction unit 302 for extracting the used conditioned air from the enveloped space. The suction unit consists of a wire mesh and a suction blower through which the used conditioned air is sucked from the enveloped space. Conditioning unit 102 has connecting duct 204 for directing the extracted used conditioned air for re-conditioning. Conditioning unit 102 further consists of delivery duct 202 for delivering the conditioned air to the enveloped space. Delivery duct 202 has a distribution grill 304 at its outlet through which the conditioned air is delivered to the enveloped space. The distribution grill 304 is provided with louvers to control the volume and direction of conditioned air to be delivered to the enclosure 106. Conditioning unit 102 also has a set of adjustable legs 306 for adjusting its height.

Conditioning unit 102 works on vapor compression refrigeration cycle. A low wattage refrigerant gas compressor 306 compresses the refrigerant gas, which after compression is passed through a condenser coil assembly 308. Refrigerant gas compressor 306 can be a rotary or reciprocating compressor with lower wattage than the compressors used in conventional air conditioning systems. Due to the lower wattage, refrigerant gas compressor 306 has lower energy requirements as compared to the compressors used in conventional air conditioning systems. Condenser coil assembly 308 condenses the compressed refrigerant gas coming from refrigerant gas compressor 306. A condenser fan 310 draws ambient air from the surrounding space over condenser coil assembly 308 in order to condense the refrigerant gas passing though condenser coil assembly 308 into a liquid. The air drawn by condenser fan 310 over the condenser coil assembly 308 becomes hot containing waste heat and is passed over a heat sink unit 324 to properly dispose the hot air.

The condensed refrigerant liquid from condenser coil assembly 308 is allowed to flash at a lower pressure by passing it through an expansion device. The expansion device can be a capillary tube or a valve, which allow the flashing of the condensed refrigerant liquid as it passes through the capillary or the valve. The expanded refrigerant vapor then passes through a chiller coil assembly 312. The refrigerant vapor passing through chiller coil assembly 312 extracts the heat energy from contact air that passes over chiller coils of chiller coil assembly 312. The low pressure refrigerant gas from the chiller coil assembly 312 is drawn by refrigerant gas compressor 306. A collection tray 314 is used to collect water that condenses over chiller coil assembly 312. A condensate drain pipe 316 is used to drain the condensate from chiller coil assembly 312 to collection tray 314.

In case conditioning unit 102 is required to generate warm conditioned air, a heater element 318 is activated and air is conditioned by passing it over the activated heater element 318.

Conditioning unit 102 further consists of a temperature control unit for controlling the temperature of the conditioned air being supplied to the enveloped space. The temperature control unit receives the desired temperature value as input from the user through a user interface and controls the functioning of heater element 318 or refrigerant gas compressor 306 in order to maintain the temperature of the conditioned air. The temperature control unit comprises a thermostat and associated circuitry for measuring the temperature inside the enveloped space and uses the measured temperature value to control the functioning of refrigerant gas compressor 306 or heater element 318. Conditioning unit 102 also has a humidity control unit, which receives the desired humidity conditions as input through a user interface and uses this input to control relative humidity of the conditioned air. The humidity control unit comprises an operating damper unit 320 and associated devices for controlling relative humidity of the conditioned air. Operating damper unit 320 splits the higher humidity recycled air into two parts and blends it with the lower humidity chilled air coming from the chiller coils. The mixing of the high humidity air and the lower humidity air is used to achieve the desired humidity level of the conditioned air. By varying the ratio in which the high humidity air is split for mixing with the lower humidity chilled air, the humidity levels of the conditioned air can be varied. A variable speed air blower 322 is used to blow the conditioned air through delivery duct 202 into the enveloped space. Conditioning unit 102 further consists of a freshness control unit, which allows fresh air into the enveloped space at a known rate in order to maintain freshness in the enveloped space.

The conditioning unit 102 is provided with lockable castors 326 to enable cartability and portability of the unit 102.

Figure 4:
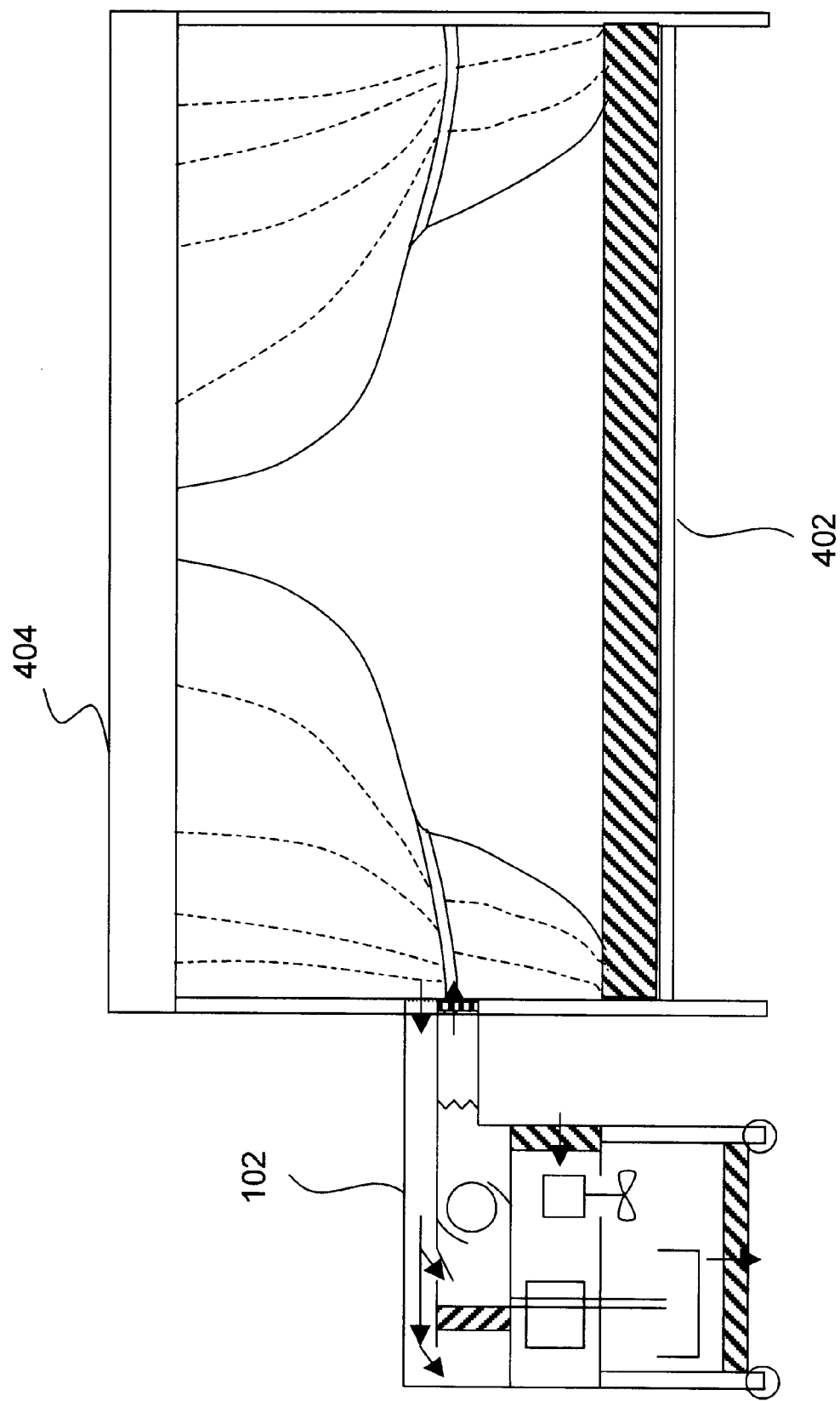
FIG. 4 is an illustration showing the conditioning unit connected to an enveloped bed in accordance with a preferred embodiment of the present invention.

FIG. 4 is an illustration showing the conditioning unit connected to an enveloped bed in accordance with a preferred embodiment of the present invention. Conditioning unit 102 is connected to enveloped space 402, which in this case, has been designed around a bed 404. Conditioning unit 102 has the option of supplying warm air or cool, dehumidified air, as desired to enveloped space 402. Conditioning unit 102 also has the provision of re-circulating the used conditioned air from the enveloped space back to conditioning unit 102 for reconditioning. The used conditioned air is extracted from the enveloped space, reconditioned and supplied back to enveloped room 402. Fresh air enters the enveloped space through small air gaps that are custom designed or that naturally exist in the thermal insulation media.

Conditioning unit 102 uses a low wattage refrigerant gas compressor for cooling the air and a heater element for heating the air. The selection of having cooled air, dehumidified air or warmed air is done through a selection device provided inside the enveloped space. The selection device can be a switch present on conditioning unit 302 or a remote control device. The conditioning effect is localized only to the enveloped space designed around the bed. Depending upon the size of the enclosed "room," the zone outside the enveloped space may get warmer due to heat rejection from the air conditioner; in such a case, an exhaust hose or an exhaust fan can be fitted on one of its sidewall or a window (to remove the heat from the enclosure).

The conditioning unit is capable of working under hot, humid and cold climates. The conditioning system can be powered using a common household single-phase low amperage circuit.

Enveloped space 402 may be created on a bed by covering its four sides with a thermal insulation medium. In the embodiment shown in FIG. 4, the thermal insulating medium is in the form of hanging curtains made of a 100% Polyester fabric and having a mass density of 105 gram per square meter.

Bed 404 can have typical king-size, queen-size or other dimensions suitable for intended applications of sleeping or resting. The free ends of the thermal insulation medium are secured by gravity sealing, hanging curtains (with edges on the side of the bed to minimize any leakage of conditioned air). Sealing the free ends of the enveloping curtains minimizes air leakage and introduces built-in flexibility, and this protects the system from any damage due to accidental stretch or pull etc. Conditioned air from conditioning unit 102 is allowed inside enveloped space 402 near the head, foot, left or the right side of the bed and the used conditioned air is allowed to exit from the opposite end.

A person skilled in the art can see that the illustration provided in the above-cited embodiment is just one example of creating an enveloped space. The enveloped space can be created around any structure and can be of any size and shape. For example, the enveloped space as described in the above-cited illustration can be built around a child bassinette, a dining table, an individual working at a personal computer, a laboratory instrument, a photocopying machine or other structures. Further, the conditioned air can be allowed to enter and the used conditioned air, which is subsequently reconditioned, can be allowed to exit from any side of the enveloped space.

The confined space conditioning system offers an efficient solution to meet the needs of localized space conditioning. The enveloped space has a lower surface area than the enclosure within which it has been built; as a result, the energy losses from the smaller surface area of the envelope material are much smaller (than the losses, which would result from a larger surface area of the enclosure). Hence, this system is highly efficient from an energy consumption perspective.

The confined space conditioning system further allows for quick conditioning of the enveloped space because of the smaller volume of the enveloped space as compared to the enclosure (and lower thermal mass of the envelope material as compared with the higher thermal mass of the enclosure).

In an alternative embodiment, the enveloped space can be provided with added features like a smoke detector, fire retardant properties of the thermal insulation medium, air freshener, reading lamp, music system, telephone connection and shelf space.

In another alternative embodiment, a health filter or an ion generator can be included in the conditioning unit to remove irritants and allergens from the air stream.

In yet another alternative embodiment, the system can be used to provide inert conditioning to an enveloped space by the use of an inert gas like Nitrogen instead of air. Such an embodiment may be used for research purposes where inert conditioned environments are required.

In yet another embodiment, the conditioning unit and the enveloped space can be integrated into one single unit. Such an embodiment can be custom designed for the purpose of intended end use.

In another alternative embodiment, the conditioning system itself can be split into compressor-condensing subsystem and chiller subsystem, and subsequently, the chiller subsystem can be integrated with the enveloped space.

While the preferred embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A confined space conditioning system for conditioning localized zones of an enclosure, an enclosure being a volume such as a large room or a container in which only specific localized zones need to be conditioned, the confined space conditioning system comprising:
    a. a conditioning unit, supplying conditioned air to the enveloped space, the conditioning unit providing controlled levels of temperature and relative humidity; and
    b. an enveloped space connected to the conditioning unit, the enveloped space comprising:
        i. a set of thermal insulation media, the thermal insulation medium being a layer or layers of insulation material covering the volume of the enveloped space for minimizing the outflow or inflow of heat flux from or into the enveloped space, the thermal insulation medium having adequate Permeability for automatic purging and intake of gases;
        ii. a sealing apparatus for sealing the free ends of the thermal insulation media;
        iii. an inlet duct for allowing the inflow of conditioned air from the conditioning unit into the enveloped space; and
        iv. an outlet duct for allowing the outflow of used air from the enveloped space to the conditioning unit.

2. The confined space conditioning system of claim 1 wherein the conditioning unit comprises:
    a. a conditioned air generation unit for generating the conditioned air;
    b. an air recycling unit for re-circulating the used air from the enveloped space back to the conditioned air generation unit for reconditioning;
    c. a temperature control unit for controlling the temperature of the conditioned air generated by the conditioned air generation unit; and
    d. a humidity control unit for controlling the relative humidity of the conditioned air generated by the conditioned air generation unit; and
    e. a heat sink unit for disposal of waste heat generated by the conditioning unit.

3. The confined space conditioning system of claim 2 wherein the conditioned air generation unit comprises:
    a. a low wattage refrigerant gas compressor for compressing the refrigerant gas used in the generation of conditioned air.
    b. a chiller coil assembly through which the compressed refrigerant gas is passed; and
    c. a variable speed blower for blowing the conditioned air to the enveloped space connected to the conditioning unit.

4. The confined space conditioning system of claim 2 wherein the conditioned air generation unit further comprises a heater element for generation of warm conditioned air.

5. The confined space conditioning unit of claim 2 wherein the conditioning unit further comprises a freshness control unit, which controls the inlet of fresh air into the enveloped space connected to the conditioning unit.

6. The confined space conditioning unit of claim 2 wherein the air recycling unit comprises:
    a. a suction means for extracting the used conditioned air from the enveloped space connected to the conditioning unit; and
    b. a connecting duct for passing the extracted air to the conditioned air generation unit for re-conditioning; and
    c. an operating damper unit for allowing a part of the recycled air to bypass the chiller coil assembly and mix with the chilled air that passes over the chiller coil assembly in order to control the humidity of the conditioned air.

7. The confined space conditioning system of claim 1 wherein the sealing apparatus secures the free ends of the thermal insulation media for minimizing air leakage from the enveloped space.

8. The confined space conditioning system as disclosed in claim 1, wherein the conditioning unit comprises means for providing an inert environment to the enveloped space.

9. A confined space conditioning system for conditioning localized zones of a large enclosure, the confined space conditioning system comprising:
    a. a conditioning unit;
    b. an enveloped space connected to the conditioning unit wherein the conditioning unit comprises:
        i. a conditioned air generation unit for generating conditioned air, the conditioned air being air with controlled/desirable levels of temperature and relative humidity;
        ii. an air recycling unit for recycling the used air from the enveloped space back to the conditioned air generation unit for conditioning;
        iii. a temperature control unit for controlling the temperature of the conditioned air generated by the conditioned air generation unit; and
        iv. a humidity control unit for controlling the humidity conditions of the conditioned air generated by the conditioned air generation unit; and the enveloped space comprises:
  i. a set of thermal insulation media, the thermal insulation medium being a layer or layers of insulation material covering the volume of the enveloped space for minimizing the outflow or inflow of heat flux from or into the enveloped space;
  ii. a sealing apparatus for sealing the free ends of the thermal insulation media;
  iii. an inlet duct for allowing the inflow of conditioned air from the conditioning unit into the enveloped space; and
  iv. an outlet duct for allowing the outflow of used air from the enveloped space to the conditioning unit.

10. The confined space conditioning system of claim 9 wherein the sealing apparatus secures the free ends of the thermal insulation media for minimizing air leakage from the enveloped space.

11. The confined space conditioning unit of claim 9, wherein the air recycling unit comprises:
  a. a suction means for extracting the used conditioned air from the localized zone connected to the conditioning unit, wherein the suction means comprising:
    i. a suction blower through which the used conditioned air is sucked from the localized zone; and
    ii. a device for filtering the used conditioned air being sucked; and
  b. a connecting duct for passing the extracted air to the conditioned air generation unit for re-conditioning.

12. The confined space conditioning system of claim 9, wherein the humidity control unit comprising an operating damper unit for allowing a part of the recycled air to bypass the chiller coil assembly and mix with the chilled air that passes over the chiller coil assembly in order to control the humidity of the conditioned air.

13. The enveloped space as disclosed in claim 9 further comprising attachments for providing at least one feature selected from the group consisting of:
  a. a fire retardant;
  b. a smoke detector;
  c. a shelf space;
  d. a facility for outside viewing;
  e. a air freshening unit;
  f. an audio/video system;
  g. a reading light; and
  h. a telephone connection.

14. The confined space conditioning system as disclosed in claim 9, wherein the conditioning unit is split into compressor-condensing subsystem and chiller subsystem, wherein the chiller subsystem is integrated with the enveloped space.

15. The confined space conditioning system of claim 9, wherein the conditioned air generation unit comprises:
  a. a low wattage refrigerant gas compressor for compressing refrigerant gas used in the generation of conditioned air.
  b. a chiller coil assembly through which the compressed refrigerant gas is passed; and
  c. a variable speed blower for blowing the conditioned air to the enveloped space connected to the conditioning unit.

16. A conditioning unit for conditioning a localized zone, the conditioning unit comprising:
  a. a conditioned air generation unit for generating the conditioned air;
  b. a temperature control unit for controlling the temperature of the conditioned air generated by the conditioned air generation unit;
  c. a humidity control unit for controlling the relative humidity of the conditioned air, the humidity control unit comprising an operating damper unit for allowing a part of the recycled air to bypass the chiller coil assembly and mix with the chilled air, the chilled air passes over the chiller coil assembly in order to control the humidity of the conditioned air;
  d. an air recycling unit for re-circulating the used air from the enveloped space back to the conditioned air generation unit for reconditioning;
  e. a heater element for generation of warm conditioned air;
  f. a freshness control unit, the freshness control unit controls the inlet of fresh air into the localized zone; and
  g. a heat sink unit for disposal of waste heat generated by the conditioning unit.

17. The conditioning unit as disclosed in claim 16, wherein the conditioned air generation unit comprises:
  a. a low wattage refrigerant gas compressor for compressing the refrigerant gas used in the generation of conditioned air;
  b. a chiller coil assembly through which the compressed refrigerant gas is passed; and
  c. a variable speed blower for blowing the conditioned air to the enveloped space connected to the conditioning unit.

18. The conditioning unit as disclosed in claim 16, wherein the air recycling unit comprises:
  a. a means for extracting the used conditioned air from the localized zone connected to the conditioning unit, wherein the extracting means comprises:
    i. a device for filtering the used conditioned air being extracted; and
    ii. a blower through which the used conditioned air is extracted from the localized zone; and
  b. a connecting duct for passing the extracted air to the conditioned air generation unit for re-conditioning.

19. The conditioning unit as disclosed in claim 16 further comprising a filter for removing irritants and allergens from the air stream.

20. The conditioning unit as disclosed in claim 16, wherein the conditioning unit is portable.

* * * * *